(12) United States Patent
Tischler (10) Patent No.: US 6,924,810 B1
(45) Date of Patent: Aug. 2, 2005

(54) HIERARCHICAL TEXTURE CACHE

(75) Inventor: Brett A. Tischler, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 213 days.

(21) Appl. No.: 10/299,367

(22) Filed: Nov. 18, 2002

Related U.S. Application Data

(63) Continuation of application No. 09/169,347, filed on Oct. 9, 1998, now Pat. No. 6,483,516.

(51) Int. Cl.$^7$ .............................................. G06F 15/67
(52) U.S. Cl. ..................... 345/541; 345/533; 345/537; 345/543; 345/557; 711/117; 711/118; 711/122; 711/130
(58) Field of Search ................................ 345/503, 519, 345/536–538, 541–543, 545, 552, 557, 531, 533; 711/117, 118, 122, 129, 130, 142, 143

(56) References Cited

U.S. PATENT DOCUMENTS

| | | | |
|---|---|---|---|
| 5,386,538 A | | 1/1995 | Nye |
| 5,467,459 A | | 11/1995 | Alexander et al. |
| 5,623,628 A | | 4/1997 | Brayton et al. |
| 5,627,994 A | | 5/1997 | Levy et al. |
| 5,659,715 A | | 8/1997 | Wu et al. |
| 5,678,009 A | | 10/1997 | Bains et al. |
| 5,680,573 A | | 10/1997 | Rubin et al. |
| 5,717,893 A | | 2/1998 | Mattson |
| 5,721,874 A | * | 2/1998 | Carnevale et al. .......... 711/171 |
| 5,801,720 A | | 9/1998 | Norrod et al. |
| 5,854,637 A | | 12/1998 | Sturges |
| 5,860,081 A | | 1/1999 | Herring et al. |
| 5,875,464 A | | 2/1999 | Kirk |
| 5,905,509 A | | 5/1999 | Jones et al. |
| 5,936,616 A | * | 8/1999 | Torborg et al. ............. 345/555 |
| 5,990,914 A | | 11/1999 | Horan et al. |
| 6,014,728 A | * | 1/2000 | Baror ......................... 711/133 |
| 6,044,478 A | | 3/2000 | Green |
| 6,047,358 A | | 4/2000 | Jacobs |
| 6,052,133 A | * | 4/2000 | Kang .......................... 345/532 |
| 6,078,338 A | | 6/2000 | Horan et al. |
| 6,094,203 A | | 7/2000 | Desormeaux |
| 6,101,589 A | | 8/2000 | Fuhrmann et al. |
| 6,105,111 A | | 8/2000 | Hammarlund et al. |
| 6,130,680 A | * | 10/2000 | Cox et al. .................... 345/544 |
| 6,163,835 A | | 12/2000 | Todd et al. |
| 6,215,497 B1 | * | 4/2001 | Leung ......................... 345/419 |
| 6,260,114 B1 | | 7/2001 | Schug |
| 6,272,598 B1 | | 8/2001 | Arlitt et al. |
| 6,282,617 B1 | | 8/2001 | Tirumala et al. |
| 6,449,692 B1 | * | 9/2002 | Krueger et al. ............. 711/122 |
| 6,483,516 B1 | * | 11/2002 | Tischler ...................... 345/552 |
| 6,591,347 B2 | | 7/2003 | Tischler et al. |

OTHER PUBLICATIONS

Z. Hakura and A. Gupta, "The Design and Analysis of a Cache Architecture for Texture Mapping," Proc. of the 24th International Symposium on Computer Architecture, pp. 108–120, May 1997.

M. Cox, N. Bhandari, M. Chantz, "Multi–Level Texture Caching for 3D Graphics Hardware," Proceedings of the 25th Annual International Symposium on Computer Architecture, vol. 26, Issue 3, pp. 86–97, Apr. 1998.

* cited by examiner

Primary Examiner—Ulka J. Chauhan (57) ABSTRACT

A dynamically configurable portion of a cache shared between central processing and graphics units in a highly integrated multimedia processor is engaged as a secondary level in a hierarchical texture cache architecture. The graphics unit includes a small multi-ported L1 texture cache local to its 2D/3D pipeline that is backed by the relatively large, single ported portion of the shared cache. Leveraging the shared cache as a secondary level texture cache reduces system memory bandwidth and die size without significant sacrifice in performance.

13 Claims, 4 Drawing Sheets

HIERARCHICAL TEXTURE CACHE

This application is a continuation of prior U.S. application Ser. No. 09/169,347 filed on Oct. 9, 1998, now U.S. Pat. No. 6,483,516.

CROSS REFERENCE TO RELATED APPLICATIONS

This application is related to common assigned and co-pending U.S. patent applications Ser. No. 09/169,314 entitled "Multimedia Processor Employing A Shared CPU-Graphics Cache" and Ser. No. 09/169,312 entitled "Dynamic Replacement Technique In A Shared Cache", contemporaneously filed herewith and all herein incorporated by reference.

BACKGROUND OF THE INVENTION

1. Field of the Invention

The invention relates generally to a highly integrated multimedia processor having a shared cache and tightly coupled central processing and graphical units and more specifically to employing a portion of the shared cache as a secondary level in a hierarchical texture cache architecture.

2. Description of Related Art

The following background information is provided to aid in the understanding of the application of the present invention and is not meant to be limiting to the specific examples set forth herein. Displaying 3D graphics is typically characterized by a pipelined process having tessellation, geometry and rendering stages. The tessellation stage is responsible for decomposing an object into geometric primitives (e.g. polygons) for simplified processing while the geometry stage is responsible for transforming (e.g. translating, rotating and projecting) the tessellated object. The rendering stage rasterizes the polygons into pixels and applies visual effects such as, but not limited to, texture mapping, MIP mapping, Z buffering, depth cueing, anti-aliasing and fogging.

The entire 3D graphics pipeline can be embodied in software running on a general purpose CPU core (i.e. integer and floating point units), albeit unacceptably slow. To accelerate performance, the stages of the graphics pipeline are typically shared between the CPU and a dedicated hardware graphics controller (a.k.a. graphics accelerator). The floating-point unit of the CPU typically handles the vector and matrix processing of the tessellation and geometry stages while the graphics controller generally handles the pixel processing of the rendering stage.

Figure 1:
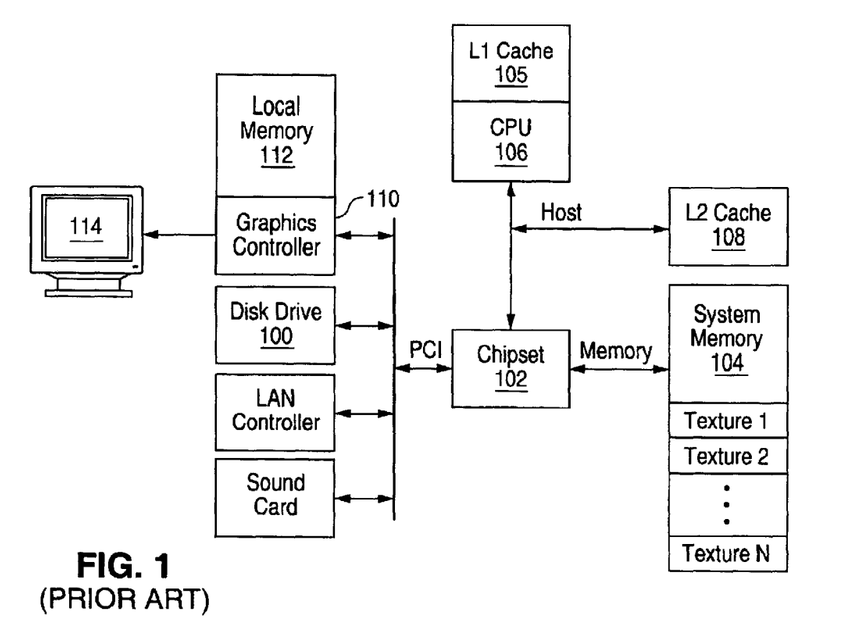
FIG. 1 is a first prior art system block diagram of handling 3D graphics display in a computer.

Reference is now made to FIG. 1 that depicts a first prior art system of handling 3D graphics display in a computer. Vertex information stored on disk drive 100 is read over a local bus (e.g. the PCI bus) under control by chipset 102 into system memory 104. The vertex information is then read from system memory 104 under control of chipset 102 into the L2 cache 108 and L1 cache 105 of CPU 106. The CPU 106 performs geometry/lighting operations on the vertex information before caching the results along with texture coordinates back into the L1 cache 105, the L2 cache 108 and ultimately back to system memory 104. A direct memory access (DMA) is performed to transfer the geometry/lighting results, texture coordinates and texture maps stored in system memory 104 over the PCI bus into local graphics memory 112 of the graphics controller 110 for use in rendering a frame on the display 114. In addition to storing textures for use with the graphics controller 110, local graphics memory 112 also holds the frame buffer, the z-buffer and commands for the graphics controller 110.

A drawback with this approach is inefficient use of memory resources since redundant copies of texture maps are maintained in both system memory 104 and the local graphics memory 112. Another drawback with this approach is the local graphics memory 112 is dedicated to the graphics controller 110, is more expensive than generalized system memory and is not available for general-purpose use by the CPU 106. Yet another drawback with this approach is the attendant bus contention and relatively low bandwidth associated with the shared PCI bus. Efforts have been made to ameliorate these limitations by designating a "swap area" in local graphics memory 112 (sometimes misdescriptively referred to as an off chip L2 cache) so that textures can be prefetched into local graphics memory 112 from system memory 104 before they are needed by the graphics controller 110 and swapped with less recently used textures residing in the texture cache of the graphics controller 110. The local graphics memory swap area merely holds textures local to the graphics card (to avoid bus transfers) and does not truly back the texture cache as would a second level in a multi-level texture cache. This approach leads to the problem, among others, of deciding how to divide the local graphics memory 112 into texture storage and swap area. Still yet another drawback with this approach is the single level texture cache in prior art graphics controllers consume large amounts of die area since the texture cache must be multi-ported and be of sufficient size to avoid performance issues.

Figure 2:
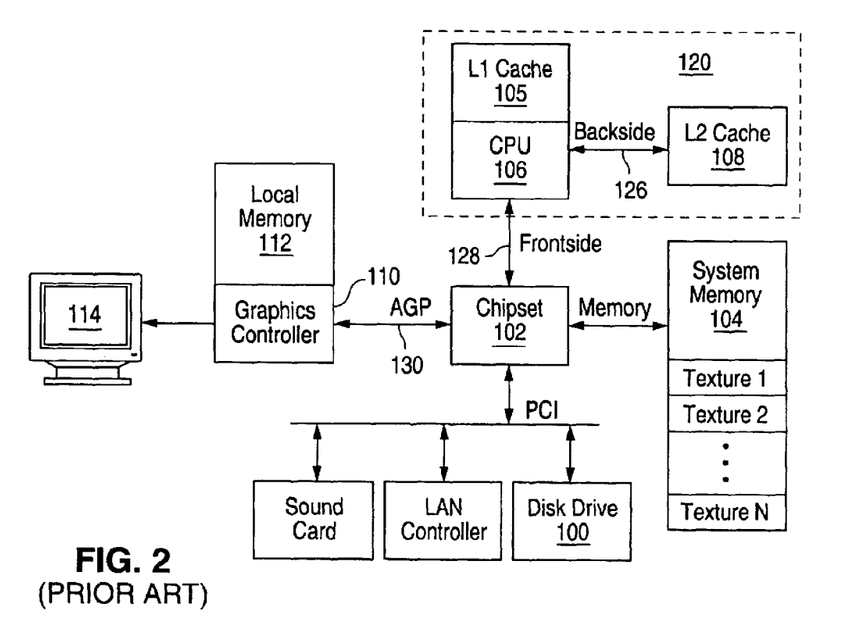
FIG. 2 is a second prior art system block diagram of handling 3D graphics display in a computer.

Reference is now made to FIG. 2 that depicts an improved but not entirely satisfactory prior art system of handling 3D graphics display in a computer. The processor 120, such as the Pentium II™ processor from Intel corporation of Santa Clara Calif., comprises a CPU 106 coupled to an integrated L2 cache 108 over a so-called "backside" bus 126 that operates independently from the host or so-called "front-side" bus 128. The system depicted in FIG. 2 additionally differs from that in FIG. 1 in that the graphics controller 110 is coupled over a dedicated and faster AGP bus 130 through chipset 102 to system memory 104. The dedicated and faster AGP bus 130 permits the graphics controller 110 to directly use texture maps in system memory 104 during the rendering stage rather than first pre-fetching the textures to local graphics memory 112.

Although sourcing texture maps directly out of system memory 104 mitigates local graphics memory constraints, some amount of local graphics memory 112 is still required for screen refresh, Z-buffering and front and back buffering since the AGP bus 130 cannot support such bandwidth requirements. Consequently, the system of FIG. 2 suffers from the same drawbacks as the system of FIG. 1, albeit to a lesser degree. Moreover, there is no way for the graphics controller 110 to directly access the L2 cache 108 that is encapsulated within the processor 120 and connected to the CPU 106 over the backside bus 126.

From the foregoing it can be seen that memory components, bus protocols and die size are the ultimate bottleneck for presenting 3D graphics. Accordingly, there is a need for a highly integrated multimedia processor having tightly coupled central processing and graphical functional units that share a relatively large cache to avoid slow system memory access and the requirement to maintain separate and redundant local graphics memory, and to leverage the relatively large shared cache in a hierarchical texture cache architecture.

SUMMARY OF THE INVENTION

To overcome the limitations of the prior art described above, and to overcome other limitations that will become apparent upon reading and understanding the present specification, the present invention discloses a highly integrated multimedia processor employing a shared cache between the central processing and graphics units which may be used in, among other things, a hierarchical texture cache scheme. A dynamically configurable portion of the shared cache is engaged as a secondary level in a hierarchical texture cache architecture. The graphics unit includes a small multi-ported L1 texture cache local to its 2D/3D pipeline that is backed by the relatively large, single ported portion of the shared cache. The graphics unit issues data reads with physical addresses to locations that are cached in the shared cache. If the shared cache misses, a cache fill is performed similar to a cache fill that occurs with a miss from the central processor unit. Regions in the shared cache can also be selectively locked down (thereby disabling eviction or invalidation of data from a selected region) to provide the graphics unit with a local scratchpad area for applications such as composite buffering for blending texture maps in multi-pass rendering. Other 3D applications for the locked down regions may include but are not limited to, bump mapping, Z buffering, W buffering and 2D applications such as blit buffering.

A feature of the present invention is the shared cache can be leveraged as a secondary level texture cache to reduce die size without significant sacrifice in performance.

Another feature of the present invention is the shared cache provides the graphics unit access to data generated by the central processing unit before the data is written-back or written-through to system memory.

Another feature of the present invention is reduction of the system memory bandwidth required by the central processing and graphics units.

Another feature of the present invention is pushing data transfer bottlenecks needed for 3D graphics display into system memory such that system performance will scale as more advanced memories become available. These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a hierarchical texture cache in accordance with the principles of the present invention.

DESCRIPTION OF THE PREFERRED EMBODIMENT

The detailed description of the preferred embodiment for the present invention is organized as follows:
1.0 Exemplary System
2.0 Exemplary Central Processing Unit
3.0 Exemplary Graphics Unit
  3.1 Hierarchical Texture Cache
4.0 Shared L2 Cache Organization
  4.1 Modified Cache Replacement
5.0 Conclusion This organizational table, and the corresponding headings used in this detailed description, are provided for the convenience of reference only and are not intended to limit the scope of the present invention.

It is to be understood that while the preferred embodiment is described herein below with respect to the x86 architecture, it has general applicability to any computer architecture. Certain terminology related to 2D/3D graphics and the x86 computer architecture (such as register names, signal nomenclature, etc.) which are known to practitioners in the field of graphics and processor design, are not discussed in detail in order not to obscure the disclosure. Moreover, in order not to obscure the disclosure with structural details which will be readily apparent to those skilled in the art having the benefit of the description herein, the structure, control, and arrangement of conventional circuits have been illustrated in the drawings by readily understandable block representations showing and describing details that are pertinent to the present invention. Thus, the block diagram illustrations in the figures do not necessarily represent the physical arrangement of the exemplary system, but are primarily intended to illustrate the major structural components in a convenient functional grouping, wherein the present invention may be more readily understood.

Figure 3:
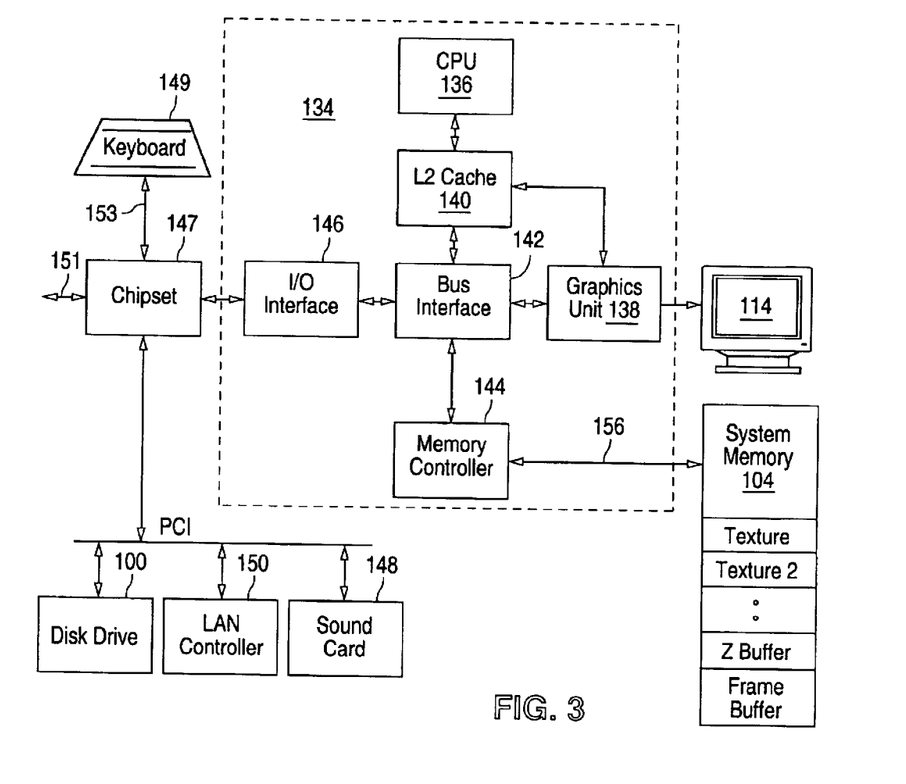
FIG. 3 is an exemplary but not limiting block diagram of a preferred multimedia processor system practiced in accordance with the principles of the present invention.

Reference is now made to the accompanying drawings, which form a part hereof, and in which is shown by way of illustration specific embodiments in which the invention may be practiced. It is to be understood that other embodiments may be utilized and structural changes may be made without departing from the scope of the present invention.
1.0 Exemplary System Referring to FIG. 3, an illustrative but not limiting block diagram of a multimedia processor system is depicted practiced in accordance with the principles of the present invention. A highly integrated multimedia processor 134, preferably formed on a unitary silicon die, includes a central processing unit (CPU) 136 having integer and floating point units and register files in accordance with the x86 architecture, a graphics unit 138, a shared L2 cache 140, a four port bus interface unit 142, a memory controller 144 and a I/O interface unit 146. The bus interface unit 142 couples together the CPU 136, the graphics unit 138, the L2 cache 140, the memory controller 144 and the I/O interface unit 146. The CPU 136 shares a single bus with the L2 cache 140 to the bus interface unit (BIU) 142. FIG. 3 logically depicts requests from the CPU 136 over the shared bus to the BIU 142 as passing through the shared L2 cache 140. The I/O interface unit 146 provides a fast interface between the processor 134 and a chipset bridge 147.

The chipset 147 supplies a local (e.g. PCI) bus connection for peripherals such as but not limited to, sound card 148, LAN controller 150, disk drive 100 as well as a fast serial link 151 (e.g. IEEE 1394 "firewire" bus and/or universal serial bus "USB") and a relatively slow I/O port 153 for peripherals such as keyboard and mouse 149. It should be understood that the chipset 147 may directly provide local bus functions such as but not limited to, sound, disk drive control, modem, network adapter etc. without departing from the scope of the present invention.

Memory controller 144 bridges the processor 134 to system memory 104 and may provide data compression/decompression to reduce the bandwidth of traffic crossing over memory bus 156 which preferably, although not exclusively has a RAMbus™, fast SDRAM or other type protocol. Graphics unit 138 provides TFT, DSTN, RGB or other type of video output to drive display 114.

2.0 Exemplary Central Processing Unit

The details of the exemplary CPU 136 are not necessary for the understanding of the present invention. However for completeness, the description of the exemplary CPU 136 can be found in contemporaneously filed and co-pending application serial number 09/169,826 entitled "L2 Cache Prefetching Using Dynamically Allocated L2 Buffers", assigned to the assignee of the present invention and herein incorporated by reference.

3.0 Exemplary Graphics Unit

Figure 4:
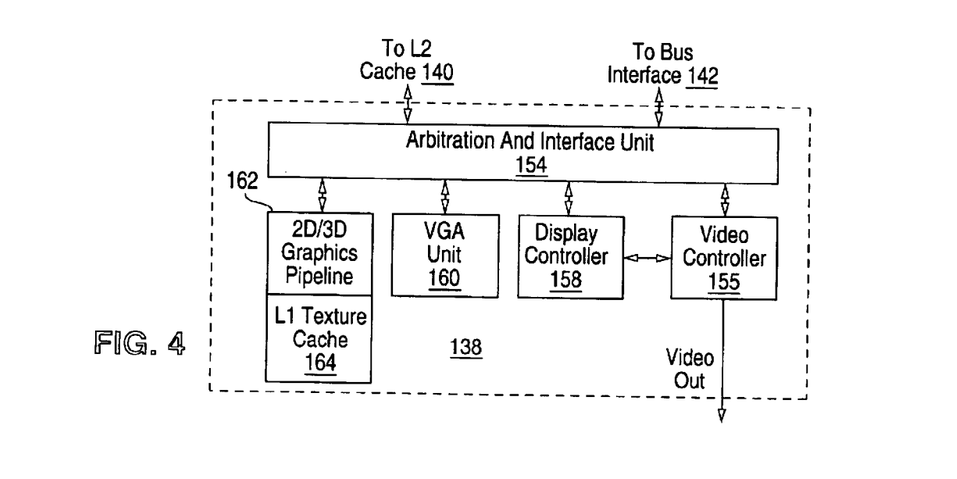
FIG. 4 is a block diagram of an exemplary but not limiting graphics unit practiced in accordance with the principles of the present invention.

Reference is now made to FIG. 4 that depicts a block diagram of an exemplary but not limiting graphics unit 138 practiced in accordance with the principles of the present invention. It is to be understood that the details of certain functional sub-units within the graphics unit 138 are not necessary for the understanding of the present invention and are only mentioned here for completeness. The graphics unit 138 includes an arbitration and interface unit 154, a video controller unit 155, a display controller unit 158, a VGA unit 160 and a 2D/3D graphics pipeline unit 162 with an L1 texture cache 164 (described in more detail herein below).

The arbitration and interface unit 154 couples the graphics unit 138 to the L2 cache 140 and to the bus interface unit 142. The arbitration and interface unit 154 arbitrates and routes read and write transactions between the L2 cache 140 and certain sub-units within the graphics unit 138 (e.g. the display controller unit 158, the VGA unit 160 and the 2D/3D graphics pipeline unit 162) and between the bus interface unit 142 and those sub-units in the graphics unit 138. The details of the exemplary arbitration and interface unit 154 are not necessary for the understanding of the present invention.

The video controller unit 155, coupled to the arbitration and interface unit 154 and the display controller unit 158, retrieves graphics and cursor/icon overlay streams from frame buffer or GART space in system memory 104, combines the cursor and the icon with the graphics stream, performs any necessary color palette lookups and generates the timing signals for the graphics stream. The resulting graphics stream is passed to the video controller unit 155 for merging with video data and for driving the display 114.

The VGA unit 160 performs functions typically associated with a VGA video compliant controller, such as, but not limited to, as described in U.S. Pat. No. 5,786,825, entitled "Virtual Display Subsystem In A Computer" to Cain et. al., issued Jul. 28, 1998, assigned to the assignee of the present invention and herein incorporated by reference.

The video controller unit 155 mixes multiple sources of video information such as an external video input (not specifically shown) with video information generated by the 2D/3D graphics pipeline unit 162 and provides a video out stream to the display 114. The video controller unit 155 maintains a line buffer in a locked down region of the L2 cache 140 (discussed in more detail herein below) to temporarily store decompressed video data for combination with frame buffer images stored in system memory 104.

The 2D/3D graphics pipeline unit 162 generates 2D and 3D graphics data and includes a dedicated setup unit (not specifically shown) along with a rasterization unit (also not specifically shown) and a first level (i.e. L1) texture cache 164 as part of a hierarchical texture cache discussed in detail herein below.

3.1 Hierarchical Texture Cache

As discussed in the Description of Related Art section above, typical graphics accelerators sometimes misdescriptively refer to a designated "swap area" in its local graphics memory as an "off chip" L2 texture cache. The local graphics memory swap area merely holds textures local to the graphics card (to avoid, among other things, slow bus transfers) and does not truly back the texture cache as would a second level in a multiple level cache. Thus prior art graphics accelerators really only have a single level texture cache. Consequently, the single level texture cache in prior art graphics controllers consume large amounts of die area since the texture cache must be multi-ported and be of sufficient size to avoid performance issues.

The present invention eliminates these drawbacks by employing a hierarchical texture cache with a small multi-ported L1 texture cache 164 local to the 2D/3D graphics pipeline unit 162 but backed by a dynamically configurable portion (e.g. a way or number of Ways) designated in the shared L2 cache 140. Textures are stored in a relatively large, single ported region of the shared L2 cache 140 (discussed herein below) that inclusively backs the small L1 texture cache 164 in the event of a miss. As discussed below, the L2 cache 140 may be used by the CPU 136 in a conventional manner while the graphics unit 138 unconventionally borrows regions from the L2 cache 140 for a number of functions including texture caching, composite buffering, z-buffering and frame buffering that in the past were provided by dedicated hardware on the graphics controller board.

Figure 5:
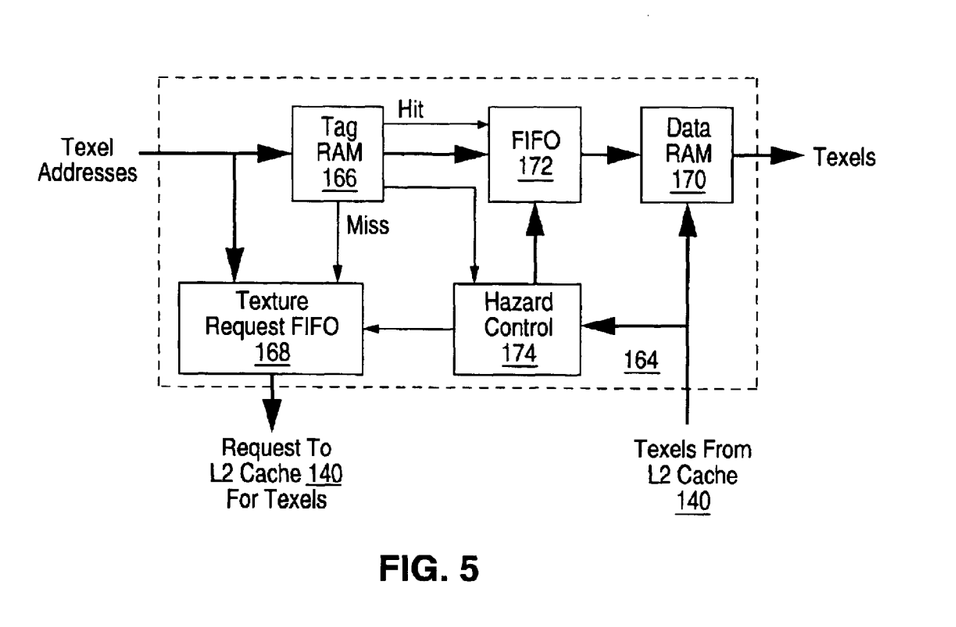
FIG. 5 is a detailed block diagram of the L1 texture cache depicted in FIG. 4.

Reference is now made to FIG. 5 that depicts a block diagram of the L1 texture cache 164 and data paths to the shared L2 cache 140 that backs it, practiced in accordance with the present invention. Texel addresses 0–3 from the texture address stage (not shown) in the 2D/3D graphics pipeline 162 are coupled to a relatively small multi-ported (e.g. 1K bytes) tag RAM 166 and to a texture request FIFO 168. The tag RAM 166 compares the texel addresses with its stored tags. When a texel address matches a stored tag (i.e. hit), the tag RAM 166 produces the location of the texel in the data RAM 170. On a miss, the texel address is fed into a texture request FIFO 168 that queues the missed texel address for a fill by the shared L2 cache 140 that backs the L1 texture cache 164. A lookahead FIFO 172 is interposed between the tag RAM 166 and the data RAM 170 to queue texels hits and mask the attendant latency of out-of-order data return from the L2 cache 140. Hazard control logic 174 coupled to the tag RAM 166, texture request FIFO 168 and lookahead FIFO 172, provides scoreboarding to allow the out-of-order data return from L2 cache 140 and to prevent textures from being de-allocated prematurely.

4.0 Shared L2 Cache Organization

Figure 6:
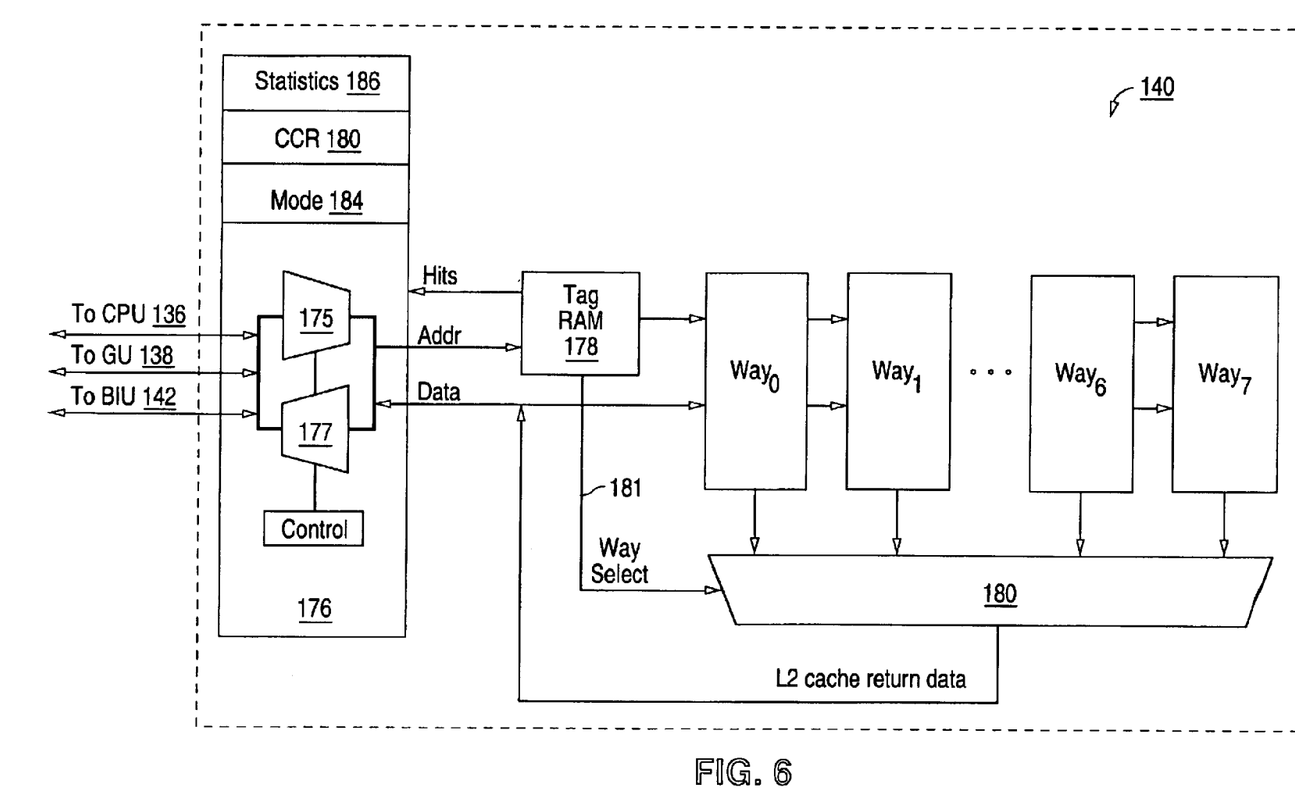
FIG. 6 is a detailed block diagram of the shared L2 cache depicted in FIG. 3; and, FIG. 7 is a flow diagram of the preferred logic to dynamically alter the cache replacement rules to avoid cache pollution in the shared L2 cache depicted in FIG. 6.

Reference is now made to FIG. 6 that depicts a detailed block diagram of the shared L2 cache 140 depicted in FIG. 3. The L2 cache 140 includes L2 controller 176 to enable shared access by the CPU 136, the graphics unit 138 and bus interface unit 142 without contention. The L2 controller 176 also provides a shared bus between the CPU 136 and the L2 cache 140 to the bus interface unit 142. Bandwidth limitations associated with accessing external memory 154 are minimized by processing shared data in the L2 cache 140

(e.g. texture, z buffer and frame buffer) between the CPU 136 and the graphics unit 138 before the shared data is written back through the bus interface unit 142 into system memory 104. L2 cache 140 fills from system memory 104 are performed through the bus interface unit 142 similarly for misses issued by either the graphics unit 138 or the CPU 136.

In the preferred embodiment, the L2 cache 140 is 256 K bytes in size organized as eight way set associative (e.g. $Way_0$–$Way_7$), 8 way interleaved (e.g. $Bank_0$–$Bank_7$). Alternatively stated, the L2 cache 140 has one-thousand-twenty-four Sets, each Set having eight Ways and each Bank (e.g. $Bank_0$–$Bank_7$) containing one-hundred-twenty-eight Sets with each Set having eight Ways. $Bank_0$–$Bank_7$ data arrays (not specifically shown) are single ported but interleaved and buses are fully pipelined to provide quasi multi-port access by the CPU 136, the graphics unit 138 and the bus interface unit 142. The L2 controller 176 includes a three input multiplexer 175 and a three output selector 177 coupled to address and data buses of the CPU 136, the graphics unit 138 and the bus interface unit 142 to provide quasi multi-port access and the shared BIU 142 bus between the CPU 136 and the L2 cache 140. Since data array $Bank_0$–$Bank_7$ of the L2 cache 140 are interleaved, multiple (and possibly unrelated) transactions can occur in the L2 cache 140 concurrently. For example, the bus interface unit 142 can perform a cache fill from system memory 104 to $Bank_3$ while the graphics unit 138 reads $Bank_6$, or the L1 cache (not specifically shown) in the CPU 136 can be filled by $Bank_5$ while graphics unit 138 writes to $Bank_7$.

It should be understood that the size (e.g. 1 Mbyte, 2 Mbyte, etc.), organization (e.g. fully associative through direct mapped), and basis for interleaving the L2 cache 140 (e.g. Bank or number of Banks) can be changed without departing from the scope of the present invention. Each Bank of the L2 cache 140 is preferably organized as one-hundred-twenty-eight Sets of eight cache lines each, with thirty-two bytes per cache line. Each thirty-two byte cache line has associated with it an address tag, a valid bit, and preferably four dirty bits (one for each quad-word, although one dirty bit per cache line is an alternative) in tag RAM 178 to allow for a partially dirty cache line on a quad-word basis. The cache line address, which originates from selected bits in the physical address generated by either the CPU 136, GU 138 or BIU 142 is compared with the tags in tag RAM 178 for each of the eight ways. A multiplexer 180, responsive to Way select signal 181 from tag RAM 178 resulting from a match with the cache line address, a not-dirty indication, and a valid indication, steers L2 cache data from that Way onto the L2 cache return data bus on a cache read for use by either the CPU 136, GU 138 or BIU 142. A programmable no write through bit and a programmable cache disable bit in control register 180 control the L2 cache 140 mode on a page by page basis and a programmable memory configuration control field can specify certain memory regions as non-cacheable.

4.1 Modified Cache Replacement

The L2 cache 140 risks being polluted when it is shared between the CPU 136 and the graphics unit 138. Pollution is an undesirable consequence resulting from a significant quantity of graphics data (e.g. textures, z buffer data, etc.) being stored in the L2 cache 140 to a point that a significant amount of non-graphics data needed by the CPU 136 is evicted from the L2 cache 140 such that the performance of the CPU 136 is effected. To ameliorate this effect, the L2 controller 176 includes logic (e.g. circuitry or software) to dynamically alter the cache replacement rules such that the graphics unit 138 is limited as to which regions in the L2 cache 140 that it can evict data. The logic to dynamically alter the cache replacement rules does not effect cache coherency since the rule changes only apply to transactions subsequent to the change.

While many forms and combinations of cache replacement logic will be appreciated by those skilled in the art, the preferred embodiment provides Mode88 and Mode28 cache replacement methods. The so-called "Mode88" method allows either the CPU 136 or the graphics unit 138 to replace data in any of the eight Ways in the L2 cache 140 that are not locked down (described in more detail herein below). The so-called "Mode28" method permits the CPU 136 to replace data in any of the eight Ways that are not locked down while limiting the graphics unit 138 to replacement in only two of the eight Ways that are not locked down (e.g. $Way_6$ and $Way_7$). It should be also understood that while the logic in the L2 controller 176 to dynamically alter the cache replacement rules described herein has particular application to sharing a cache between the CPU 136 and the graphics unit 138, it also has application to other forms of shared caches (e.g. a unified instruction and data cache).

The L2 controller 176 includes a programmable mode register 184 to select between replacement modes Mode88 or Mode28. Monitor circuitry in the form of a statistic counter 186 is also provided by L2 controller 176 to monitor the number of hits/misses in the L2 cache 140 resulting from accesses by either the CPU 136 and/or the graphics unit 138.

Figure 7:
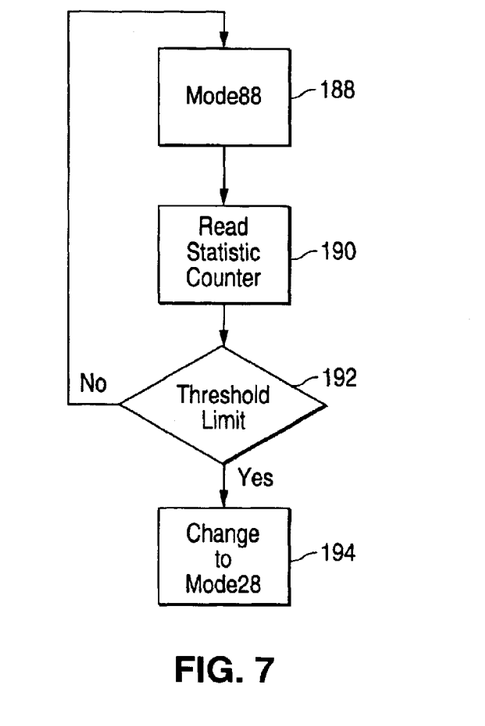

Reference is now made to FIG. 7 that depicts a flow diagram of the preferred logic to dynamically alter the cache replacement rules to avoid cache pollution in the shared L2 cache 140 depicted in FIG. 6. At step 188, Mode88 is assumed to be invoked by the contents of register 184 thus permitting either the CPU 136 or the graphics unit 138 to replace data in any of the unlocked eight Ways in the L2 cache 140. At step 190, an application program or a software driver executing under an operating system running on the CPU 136 reads the statistic counter 186. At step 192, the contents of the statistic counter 186 are compared against a predetermined threshold (fixed or settable) to determine whether the graphics unit 138 is polluting the L2 cache 140. If the threshold is exceeded, the application program or software driver writes to mode register 184 at step 194 to select Mode28 to reduce pollution by limiting the graphics unit 138 to replacement in only two of the eight Ways in the L2 cache 140. If the threshold is not exceeded, the application program or software driver does not change the mode register 184 and periodically repeats the loop of steps 188–192 at a predetermined frequency to check if pollution is occurring. It should also be understood that steps 188–194 can be performed by dedicated hardware rather than software without departing from the scope of the present invention.

The L2 controller 176 further includes circuitry to lock down the eight Ways (Way0–Way7) independent of one another on a cache line basis for either dedicated or shared use by either the CPU 136 or the graphics unit 138. In the preferred embodiment, locking cache lines in $Way_0$ is reserved for use by the CPU 136 and locking cache lines in $Way_7$ is reserved for use by the graphics unit 138. Those skilled in the art will recognize other granularities (e.g. fractional or multiple cache lines or even whole Ways) and other basis (e.g. other Way or Ways available to either the CPU 136 or the graphics unit 138) without departing from the scope of the present invention.

Locking down a Way means that the Way is never replaced regardless of the "least recently used" use indicator (i.e. LRU) of that Way, the valid bits are forced "valid" and the dirty bits are forced "not dirty" to avoid eviction from that Way. While many forms of cache locking exist, an illustrative but not limiting example suitable for adaptation for use with the present invention is described in co-pending and commonly assigned U.S. patent application Ser. No. 08/464,921, filed Jun. 5, 1995, entitled "Cache having Spatially Defined Programmable Locked-Down Regions" which is herein incorporated by reference. Exemplary but not limiting uses for the locked down regions include storage of virtual subsystem architecture code described in co-pending and commonly assigned application Ser. No. 08/540,351 filed Oct. 6, 1995, entitled "Processor Architecture For Eliminating External Isochronous Subsystems" herein incorporated by reference, line buffering to hold decompressed video for further combination (e.g. filtering) with frame buffer data, and composite buffering for blending texture maps in multi-pass rendering. Other applications for the locked down regions include, but are not limited to, bump mapping, Z buffering, W buffering and 2D applications such as blit buffering.

5.0 Conclusion

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A processor comprising:
   central processing unit operable to execute one or more instructions;
   a graphics unit operable to process graphics data;
   a cache operable to be shared by the central processing unit and the graphics unit, the cache comprising a dynamically configurable portion, in which at least a portion of the graphics data is stored by at least one of the central processing unit and the graphics unit, and a controller operable to control access to the cache by the central processing unit and the graphics unit;
   wherein the controller is operable to allow access to the cache in one of a plurality of modes, each mode allowing different access to the shared cache where
      a first mode allows the central processing unit and the graphics unit to replace data in any region of the shared cache; and
      a second mode allows the central processing unit to replace data in any region of the shared cache and that allows the graphics unit to replace data in a subset of the regions of the shared cache.

2. The processor of claim 1, wherein the graphics data is transferred between the central processing unit and the graphics unit through the cache without using a system memory.

3. The processor of claim 1, wherein the controller is operable to dynamically alter one or more rules used to control access to the shared cache, the one or more rules at least partially defining the dynamically configurable portion of the shared cache.

4. A processor comprising:
   central processing unit operable to execute one or more instructions;
   a graphics unit operable to process graphics data;
   a cache operable to be shared by the central processing unit and the graphics unit, the cache comprising a dynamically configurable portion in which at least a portion of the graphics data is stored by at least one of the central processing unit and the graphics unit, and a controller operable to control access to the cache by the central processing unit and the graphics unit;
   the controller is operable to count at least one of a number of cache hits and a number of cache misses associated with the shared cache; and is further operable to allow access to the cache in one of a plurality of modes, each mode allowing different access to the shared cache;
   the central processing unit is operable to compare at least one of the number of cache hits and the number of cache misses to a threshold and to change the mode in which the controller operates based on the comparison.

5. A processor system comprising:
   a processor;
   a system memory operable to store data; and
   a bus operable to facilitate communication between the processor and one or more peripheral devices;
   wherein the processor comprises:
      a central processing unit operable to execute one or more instructions;
      a graphics unit operable to process graphics data; and
      a cache operable to be shared by the central processing unit and the graphics unit, the cache comprising a dynamically configurable portion in which at least a portion of the graphics data is stored by at least one of the central processing unit and the graphics unit, and a controller operable to control access to the shared cache by the central processing unit and the graphics unit; and
      the controller is operable to allow access to the shared cache in one of a plurality of modes, each mode allowing different access to the shared cache;
   a first mode allows the central processing unit and the graphics unit to replace data in any region of the shared cache; and
   a second mode allows the central processing unit to replace data in any region of the shared cache and that allows the graphics unit to replace data in a subset of the regions of the shared cache.

6. The processor system of claim 5, wherein the graphics data is transferred between the central processing unit and the graphics unit through the shared cache without using the system memory.

7. The processor system of claim 5, wherein the shared cache comprises a controller operable to control access to the shared cache by the central processing unit and the graphics unit.

8. The processor system of claim 5, wherein the controller is operable to dynamically alter one or more rules used to control access to the shared cache, the one or more rules at least partially defining the dynamically configurable portion of the shared cache.

9. A method Comprising:
   receiving a request for data in a cache, the cache operable to be shared by a central processing unit and a graphics unite the cache comprising a dynamically configurable portion in which graphics data is stored by at least one of the central processing unit and the graphics unit;
   retrieving the requested data; and
   providing the requested data to at least one of the central processing unit and the graphics unit;
   wherein access is allowed to the shared cache in one of a plurality of modes, each mode allowing different access to the shared cache, a first mode allows the central processing unit and the graphics unit to replace data in any region of the shared cache; and a second mode allows the central processing unit to replace data in any region of the shared cache and that allows the graphics unit to replace data in a subset of the regions of the shared cache.

10. The method of claim 9, further comprising storing the requested data in the cache, the requested data provided to the cache by the central processing unit; and wherein providing the requested data comprises providing the requested data to the graphics unit, wherein the requested data is transferred between the central processing unit and the graphics unit without using a system memory.

11. The method of claim 9, further comprising dynamically altering one or more rules used to control access to the shared cache, the one or more rules at least partially defining the dynamically configurable portion of the shared cache.

12. The method of claim 9, wherein allowing access to the shared cache comprises:

counting at least one of a number of cache hits and a number of cache misses associated with the shared cache;

comparing at least one of the number of cache hits and the number of cache misses to a threshold; and changing the mode based on the comparison.

13. The method of claim 9, wherein:

the shared cache comprises a second level cache;

the graphics unit comprises a first level cache; and the method further comprises:

determining whether the requested data is present in the first level cache;

retrieving the requested data from the first level cache if the requested data is present in the first level cache; and generating and communicating the request to the second level cache when the requested data is not present in the first level cache.

* * * * *

UNITED STATES PATENT AND TRADEMARK OFFICE
CERTIFICATE OF CORRECTION

PATENT NO. : 6,924,810 B1
DATED : August 2, 2005
INVENTOR(S) : Brett Tischler It is certified that error appears in the above-identified patent and that said Letters Patent is hereby corrected as shown below:

Column 10,
Line 57, change "unite" to -- unit --.

Signed and Sealed this

Twenty-ninth Day of November, 2005

JON W. DUDAS
*Director of the United States Patent and Trademark Office*